March 31, 1970     V. J. TOMSIC     3,503,515
PERMEATION SEPARATORY APPARATUS
Filed Oct. 3, 1968
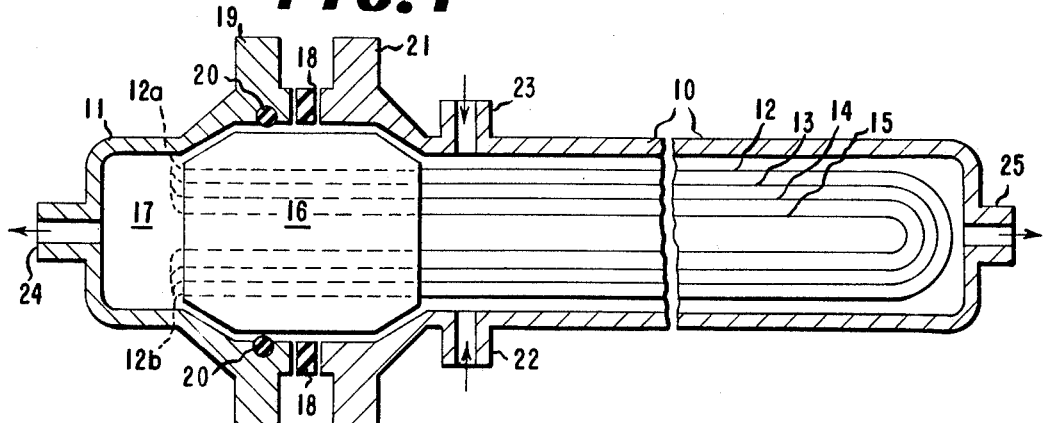
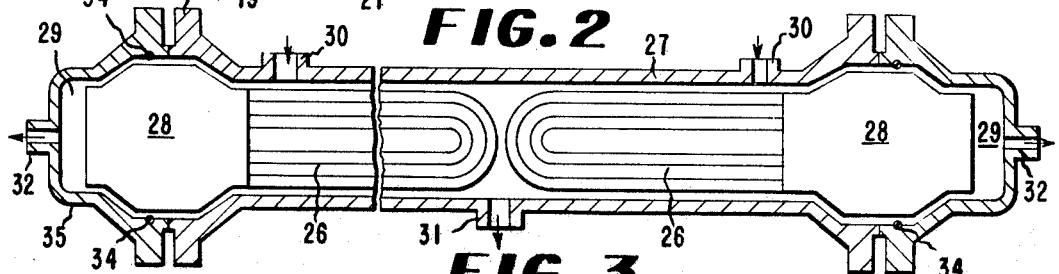
INVENTOR
VICTOR J. TOMSIC
BY
ATTORNEY

United States Patent Office 3,503,515
Patented Mar. 31, 1970

3,503,515
PERMEATION SEPARATORY APPARATUS
Victor J. Tomsic, Limestone Gardens, Wilmington, Del.,
assignor to E. I. du Pont de Nemours and Company,
Wilmington, Del., a corporation of Delaware
Filed Oct. 3, 1968, Ser. No. 764,674
Int. Cl. B01d 13/00
U.S. Cl. 210—321                                                 6 Claims

ABSTRACT OF THE DISCLOSURE

A permeation separatory apparatus for separating fluid mixture components, which comprises a cylindrical jacket or casing containing a plurality of permeable hollow fibers in its interior extending substantially the length of the cylinder and which open in a collecting zone separate from the interior of the casing. The interiors of the hollow fibers are not in communication with the interior of the casing thus allowing the component of the fluid mixture which passes through the walls of the hollow fibers to be drawn off in the collecting zone substantially free of the other components of the fluid feed mixture. The casing is packed with inert particulate material, such as sand, glass or plastic beads, thus filling void or empty spaces between the hollow fibers. Such packing ensures proper fluid flow around the fibers.

BACKGROUND OF THE INVENTION

Field of the invention

This invention relates to an improved permeation apparatus for separating fluid mixture components. More specifically, the invention concerns an improved apparatus for separating fluid mixture components by utilizing their different permeation rates through membrane elements in the form of small hollow organic filaments or fibers.

Description of the prior art

Membranes have long been employed as separatory means. Some pass water but restrain ions and are known as osmotic membranes. Others possess selective permeation rates for fluid components of fluid mixtures. Still other pass ions but tend to restrain passage of high-molecular-weight components. The selective permeability of such membranes imparts usefulness for the membranes in permeation separatory devices.

However, the slow rate of transfer of the desired component from one side of the membrane to the other has impeded the widespread use of membranes for large-scale separation purposes. Recently, various means have been disclosed to obtain optimum rates of such transfer. This has been accomplished by maximizing the surface area of the membrane by making the membrane in the form of a hollow fiber and by maintaining a pressure differential between the two sides of the fibrous membrane. The hollow fibers are in the form of long, small-diameter, hollow organic fibers. A multitude of them are employed inside the casing of the permeation apparatus. The fluid feed mixture to be separated is admitted to the casing under pressure where the component desired to be separated passes, by permeation, through the walls of the hollow fibers to the inside of the hollow fiber. The ends of the hollow fibers open into a chamber or chambers separated from the inside of the casing and the desired component is drawn off through these chambers. The remaining effluent, which does not pass through the walls of the hollow fibers, is drawn off through an outlet in the casing.

However, a disadvantage of the apparatus described above results from the fact that it is difficult to pack the organic hollow fibers into the casing evenly so as to leave a minimum amount of void or empty space inside the shell. Such uneven packing results in poor separation of the fluid feed mixture due to the imperfect distribution or flow of the feed mixture around the multitude of hollow fibers since the fluid feed will take the path of least resistance from inlet to outlet. In other words, the flow of fluid within the casing progresses in channels between the outside surfaces of adjacent fibers. Thus, if void spaces exist, the feed mixture will tend to find the largest voids and will not come into normal contact with many of the fiber walls. This of course will decrease the efficiency of the permeation apparatus. Moreover, the fluid feed will tend to collect in some voids and as the desired component passes through the walls of the fibers adjacent these voids, the concentration of components left behind in the void will increase. As the concentration of "residue" increases, some of it will pass through the walls of the hollow fibers, thus increasing the impurity content of the desired component drawn off. Additionally, if the impurities are salts, some will precipitate out of these concentrated places, thus reducing the area of hollow fiber surface available for permeation. Furthermore, if voids exist along the inside of the casing, the fluid feed will tend to flow down the inside wall of the casing, bypassing all contact with the walls of the hollow fiber.

The improved permeation devices of this invention overcome the above-recited disadvantages by providing elements which reduce the amount of voids, thereby causing the fluid feed to contact the total outside surface area of the hollow fibers.

SUMMARY OF THE INVENTION

In a permeation assembly for separating a permeable fluid from a fluid mixture, which assembly comprises:

an elongated fluid-tight casing,
a plurality of long, thin, permeable hollow fibers maintained within said casing and extending longitudinally along the length of said casing for at least substantially the length of said casing, at least one end of each of said hollow fibers extending through one end wall of said elongated casing and the other end, if not also extending through an end wall of said casing, being sealed to prevent communication between the interior of each hollow fiber and the interior of said casing,
inlet means on said casing for passing a fluid mixture into said casing,
outlet means on said casing for removing fluid from said casing,
and means communicating with the open ends of said hollow fibers to collect fluid flowing therefrom;

the improvement which comprises maintaining within said casing an amount of inert, particulate solid sufficient to substantially fill void spaces inside said casing not filled by said hollow fibers.

DESCRIPTION OF THE DRAWINGS

FIGURE 1 is a longitudinal section view of a permeation device employed in this invention showing the detail of its construction.

FIGURE 2 is a longitudinal section view of another type of permetation device employed in this invention showing the detail of its construction.

FIGURE 3 is a longitudinal section view of still another type of permeation device employed in this invention showing the detail of its construction.

FIGURE 4 is an enlarged view of a cut-away portion of the casing of a permeation device which shows the positioning of the hollow fibers within the casing.

FIGURE 5 is an enlarged view of a cut-away portion of the casing of FIGURE 4 which shows the particulate, inert solid material filling the space between the hollow fibers within the casing.

DESCRIPTION OF THE INVENTION

The separatory permeation devices useful for employment in this invention are in general well known in the art. For example, Mahan, U.S. Patent 3,228,877, discloses at cylindrical jacket or casing capped at both ends, which contains a plurality of small-diameter, permeable hollow fibers running the length of the casing and extending through the capped ends of the casing. A number of discrete bundles of hollow fibers are used and they are supported only at the ends of the casing. The permeate (the fluid component passing through the walls of the fibers) may be removed from either capped end of the apparatus. Since the fibers are not supported inside the cylindrical casing, it is evident that voids will occur inside.

Another permeation device that can be employed in this invention is disclosed in British Patent 1,019,881. This device is similar to the one described in the foregoing paragraph except that the hollow fibers do not extend through both ends of the cylindrical casing. Instead, the hollow fibers, which are about twice as long as the casing, extend its length and are then looped back to extend the length of the casing again. In other words, the hollow fibers form a U inside the casing so that both ends of each fiber open through the same capped end of the casing. The fiber bundles, are supported only at both ends of the casing, thus allowing void spaces to occur.

Still another type of permeation device useful in this invention is described in McCormack U.S. Patent 3,246,764. In this embodiment, only one end of the hollow fibers extends through the capped end of the casing. The other end of the hollow fibers is terminated within the casing by embedding it in a plug or plate so as to seal off the interior of each fiber from the interior of the casing.

Still other permeation devices are described in Maxwell et al. U.S. Patent 3,339,341. The basic design of the Maxwell et al. permeation device is substantially the same as those set forth above; however, Maxwell et al. discloses that the fibers can be supported along their length inside the casing, as well as at their ends.

The preferred type of permeation device is the one similar to that described in the British patent. However, contrary to the British patent, the U-shaped fiber bundle preferred comprises one large bundle which is packed inside the casing. One such variation is shown in FIGURE 1. The cylindrical jacket or casing is formed by steel shell 10 and steel header 11. The bundles of hollow fibers 12, 13, 14 and 15 are packed in the steel shell 10 and are looped so that thier open ends (e.g., 12a and 12b) exit through a pressure-tight epoxy block 16 which effectively divides the interior of steel shell 10 from permeate liquid collecting space 17 by means of gasket seal 18 and O ring seal 20. The fluid feed mixture, e.g., brackish water, sea water, or hydrogen and helium or the like, is forced under pressure through feed inlets 22 and 23 into the interior of steel shell 10 where the component desired to be separated, e.g., water or helium, passes through the walls of the hollow fibers and flows into collector 17 to permeate exit 24. The fluid components not passing through the walls of the hollow fibers pass out of steel shell 10 through exit 25. The flow can be reversed, i.e., fluid to be separated can enter through opening 25 while reject fluid can exit through openings 22 and 23. The header 11 and shell 10 are maintained in fluid-tight seal relationship by fastenings (not shown) at flange 19 on the header and flange 21 on the shell.

Another variation is described in FIGURE 2. The figure depicts a double-end, double-bundle permeation device. The hollow fibers 26 are looped at the center of steel shell 27, so that dual-looped bundles can be inserted at each end of shell 27. They pass through each of epoxy end blocks 28 and open into each of permeate collecting spaces 29. Inlet ports 30 provide means for entrance of the fluid mixture into the interior of shell 27, while outlet 31 is an exit for the reject fluid. The separated permeate is drawn off through exits 32. Flanges 33 and O ring 34 provide sealing means for shell 27 and header 35.

Still another variation is described in FIGURE 3 which is somewhat similar to the variation shown in FIGURE 2 except that the position of the hollow-fiber double bundles is reversed. In this embodiment, dual-looped bundles of hollow fibers 36 are placed in steel shell 37 so that their open ends extend through each of epoxy blocks 38 and open into permeate collecting space 39. Fluid mixture enters feed inlets 40 and the fluid reject exits through outlets 41. The component that passes through the walls of the hollow fibers is collected in collecting space 39 and is drawn off through outlet 42. O rings 43 and flanges 44 provide means for maintaining pressure seals.

The hollow fibers employed in the permeation devices are small-diameter, polymeric, permeable fibers prepared as described in the art, e.g. Breen et al. U.S. Patent 2,999,296 and Maxwell et al. U.S. Patent 3,339,341 as well as in coassigned patent applications Ser. Nos. 674,425, 674,569 and 678,148, all filed Oct. 11, 1967. The composition of the hollow fibers will depend upon the fluid composition to be separated. These compositions are known in the art and are described in the foregoing patents. The polymer fibers can be prepared, for example, from polymers of olefins, amides, silicones, ethers, nitriles, sulfides and the like. Fibers can be made from polyethylene terephthalate polyvinyl chloride, polyvinylidene chloride, polyhexamethylene adipamide, copolymers of tetrafluoroethylene and hexafluoropropylene, cellulose acetate, ethyl celluose, polystyrene, copolymers of butadiene and styrene, methacrylates, polyamides and modified polyamides. The fibers preferably have an outside diameter of 10–250 microns, a wall thickness of 2–75 microns, and a ratio of the cross-sectional area of the internal bore to the total cross-sectional area of the fiber of about 0.1 to about 0.6.

The permeation devices can be assembled as described in Maxwell et al., U.S. Patent 3,339,341, i.e., once the fibers are prepared and bundled, the epoxy block is cast in a mold to surround the bundled hollow-fiber ends and after casting the bundle is placed in the permeation device casing. As stated previously, the looped-fiber bundles are preferred, primarily because the looped-fiber bundles having only one epoxy block cast around them can be easily handled, than a straight bundle having an epoxy block at each end of the bundle.

All of the aforedescribed permeation devices contain voids or empty spaces within the casing which, as described previously, reduce the efficiency of the devices. It has now been found that the poor fluid feed flow caused by the presence of these voids can be improved by maintaining within the casing filler means which eliminates the voids and provides a surface by which the fluid feed mixture is channeled into contact with the outer surface of the hollow fibers. A variety of filler means may be employed to improve the fluid feed flow. The packing of particulate inert solid particles, such as fine sand, glass or plastic particles, into the interior of the casing to fill all unproductive voids or pockets accomplishes the objective of this invention.

Preferably the inert particulate particles are about 40–80 microns in length and width. The particles are placed in the casing containing the fiber bundles most conveniently by simply blowing them in with air pressure while blocking all other exits.

The inventive aspect of this invention is shown in FIGURES 4 and 5 which depict an enlarged cut-way section of the casing of a permeation apparatus containing fiber bundles. In FIGURE 4, the uneven configuration of each hollow fiber 46 within casing 47 is seen to leave many voids or empty spaces 48. By forcing the small inert particulate particles into the interior of the casing, the voids or empty spaces become filled with the particulate particles 49 as seen in FIGURE 5. The presence of the particles breaks up the flow of the fluid feed mixture, which would otherwise fill the voids and flow down the void channels, and distributes the feed mixture throughout the interior of the casing so that it can contact the exterior walls of the hollow fibers.

By means of this invention, it has been determined that the packing density of the interior of the casing (the ratio of the interior volume of the shell taken up by the combined volume of the filler and the fibers to the interior volume of the casing itself) can be increased from usually about 30–40 percent for the fibers alone to about 65–75 percent for the combination of the filler and the fibers. The improved results obtained by the increase in packing density are shown in the following examples which are intended to exemplify the invention.

EXAMPLES

Permeation devices employed in the following examples had a casing inside diameter of 3 inches and an effective length of 5 feet from the edge of the epoxy end block to the looped end of the fiber bundle. The hollow fibers employed were composed of a polyamide ["Zytel" nylon] and were made with a spinneret like that described in Breen et al. U.S. Patent 2,999,296. The devices corresponded to those described in FIGURE 1. The casing had a fluid mixture feed entrance at a point near the epoxy end block and an exit for the efficient reject (fluid not passing through the fiber walls) near the looped end of the fiber bundle. The hollow fibers were looped so that both ends open into the same collecting space after passing through the epoxy end block. The sealing of the epoxy end block in to the casing is described in Maxwell et al. U.S. Patent 3,339,341, as is the assembly of the fiber bundle and its installation in the casing.

In operation of the permeation devices used in the following examples, a synthetic feed of brackish water composed of water containing 700 parts per million of calcium sulfate, 400 parts per million of magnesium sulfate, and 400 parts per million of sodium sulfate was prepared. This composition approximates the composition of brackish water found in some parts of southwestern United States. This fluid feed mixture was pumped into the interior of the casing of the permeation device and the flow limited at the shell outlet until a pressure of 600 pounds per square inch was obtained inside the shell. The permeate (water) from the interior of the hollow fibers and the reject remaining in the shell were both routed back to the original fluid feed mixture.

An ideal device would, of course, permit no passage of salt through the walls of the hollow fibers and thus the percent salt in the permeate would be 0.0 percent, while the apparent salt passage through the walls would also be 0.0.

EXAMPLE 1

Sand-packed permeation apparatus

The permeation apparatus described above contained a calculated fiber volume of 2065 cubic centimeters. The volume of the casing interior was 6884 cubic centimeters, resulting in a packing density of about 30 percent. The synthetic brackish water was run through the device with the results shown in Table I below.

Void spaces in the casing interior were then filled by air blowing 30/40-mesh Ottawa sand into the interior while blocking the exits with a 100-mesh screen. 1721 cubic centimeters of sand were blown in, thus raising the packing density to about 55 percent. The synthetic brackish water was again run through the appartus with the results shown in Table I below.

TABLE I

| Filler | Hours of Operation | Percent Conversion | Percent Salt Concentration in the— | | Percent Apparent Salt Passage |
|---|---|---|---|---|---|
| | | | Feed | Permeate | |
| None | 0 | | 0.15 | | |
| | 3 | 30.4 | 0.133 | 0.0116 (*116) | 8.72 |
| | 21 | 24.6 | 0.137 | 0.0144 (*144) | 10.51 |
| | 42 | 24.4 | 0.112 | 0.0149 (*149) | 14.61 |
| 30/40 Ottawa Sand | 0 | | 0.17 | | |
| | 24 | 28.8 | 0.16 | 0.0104 (*104) | 6.62 |
| | 46 | 30.8 | 0.15 | 0.0109 (*109) | 7.17 |
| | 51 | 30.0 | 0.146 | 0.012 (*120) | 8.21 |

* Parts per million.

It is seen that without the filler the percent of apparent salt passage through the walls of the hollow fibers increased by about 67 percent over a 42-hour period, whereas with the filler, the percent increase over a comparable time period (46 hours) was only about 8.3 percent. The difference is attributed to the fact that salt concentration builds up where voids are present so that permeate from that area has higher salt content due to the higher salt content in the feed at that location. Filing the voids with a filler urges the fluid feed flow along channels between fibers so that the salt concentration does not have an opportunity to build up.

It is also seen that the percent conversion (the proportion of feed mixture that passes through the walls of the hollow fibers) shows a steady decrease in the permeation apparatus that does not contain any filler. This decrease is attributed to the precipitation of salt in the areas of some voids or poor flow around the exterior of the hollow fibers which decreases the available permeation surface area.

It is further seen that the percent salt concentration in the feed mixture decreases more rapidly in the unfilled permeation apparatus than in the sand-filled apparatus. This is attributed to salt precipitation, thus trapping salt within the permeator.

EXAMPLE 2

Glass-bead-packed permeation apparatus

When a permeation apparatus was packed with spherical glass beads of 44 to 74 micron diameters until the calculated packing density was about 69 percent, the results obtained by passing the synthetic brackish water fluid feed mixture through the permeator were even better than the results obtained with the sand-packed apparatus. The comparison is shown in Table II following. The comparison was made at 50 percent conversion.

TABLE II

| Filler | Packing Density | Average Percent Sulfate in Permeate | Percent Apparent Salt Passage |
|---|---|---|---|
| 30/40-mesh Ottawa sand | 55 | 0.0156 (*156) | 12.07 |
| 44–74 micron glass beads | 69 | 0.0091 (*91) | 5.42 |

* Parts per million.

It is seen that the average salt concentration in the permeate obtained is 42 percent less in the glass-bead-filled apparatus than in the sand-filled apparatus.

After operation of the glass-bead-filled apparatus for about 116 hours, the percent of apparent salt passage remained essentially unchanged, and after operation for about 78 hours at 90% conversion, the percent remained essentially unchanged.

By replacing the hollow fibers employed in the foregoing examples with others known in the art, separation of other types of fluid mixtures can be obtained, e.g., the extraction of bicarbonate or dissolved gases from water, of helium from natural gases, or of hydrogen from refinery gases.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. In a permeation assembly for separating a permeable fluid from a fluid mixture, which assembly comprises:
   an elongated fluid-tight casing,
   a plurality of long, thin, permeable hollow fibers maintained within said casing and extending longitudinally along the length of said casing for at least substantially the length of said casing, at least one end of each of said hollow fibers extending through an end wall of said elongated casing and the other end of each of said hollow fibers being sealed to prevent communication between the interior of each hollow fiber and the interior of said casing,
   inlet means on said casing for passing a fluid mixture into said casing,
   outlet means on said casing for removing fluid from said casing,
   and means communicating with the open ends of said hollow fibers to collect fluid flowing therefrom; the improvement which comprises maintaining within said casing an amount of inert, particulate solid sufficient to substantially fill void spaces inside said casing not filled by said hollow fibers.

2. In the improved permeation assembly of claim 1, the improvement in which the inert particulate solid comprises sand.

3. In the improved permeation assembly of claim 1, the improvement in which the inert particulate solid comprises glass beads having a diameter of 40–80 microns.

4. In a permeation assembly for separating a permeable fluid from a fluid mixture, which assembly comprises:
   an elongated, fluid-tight casing,
   a plurality of permeable hollow fibers made of organic polymeric material maintained within said casing and extending longitudinally along the length of said casing and being looped such that both ends of each said hollow fibers extend through the same end of the elongated casing, said fibers being sealed to prevent communication between the interior of each fiber and the interior of said casing,
   inlet means on said casing for passing a fluid mixture into said casing,
   an outlet means on said casing for removing fluid from said casing,
   the improvement which comprises maintaining within said casing an amount of inert, particulate solid sufficient to substantially fill void spaces inside said casing not filled by said fibers.

5. In the improved permeation assembly of claim 4, the improvement in which the inert particulate solid comprises sand.

6. In the improved permeation assembly of claim 4, the improvement in which the inert particulate solid comprises glass beads having a diameter of 40–80 microns.

References Cited

UNITED STATES PATENTS

| | | | |
|---|---|---|---|
| 3,228,877 | 1/1966 | Mahon | 210—321 X |
| 3,246,764 | 4/1966 | McCormack | 210—321 |
| 3,442,002 | 5/1969 | Geary et al. | 210—321 X |
| 3,422,008 | 1/1969 | McLain | 210—321 |

JAMES L. DECESARE, Primary Examiner